United States Patent [19]

Hayashi et al.

[11] 4,300,448
[45] Nov. 17, 1981

[54] APPARATUS FOR EXTRACTING PULP FROM CITRUS FRUITS

[75] Inventors: Masayuki Hayashi, Komaki; Yasushi Ifuku; Hirofumi Uchiyama, both of Wakayama; Yosimi Kaga, Aichi; Akifumi Nakamori, Kure, all of Japan

[73] Assignees: Mitsubishi Jukogyo Kabushiki Kaisha, Tokyo; Prefectural Economic Federation of Agricultural Co-operatives, Wakayama, both of Japan

[21] Appl. No.: 160,721

[22] Filed: Jun. 18, 1980

Related U.S. Application Data

[63] Continuation of Ser. No. 27,930, Apr. 6, 1979, abandoned.

[30] Foreign Application Priority Data

Apr. 10, 1978 [JP] Japan .................................. 53-42005

[51] Int. Cl.³ .............................................. A23N 4/24
[52] U.S. Cl. ....................................... 99/516; 99/537; 99/540; 99/584
[58] Field of Search ................. 99/487, 495, 502, 504, 99/516, 536, 538, 552, 584, 537, 540; 426/481, 489, 590, 599, 475, 506

[56] References Cited

U.S. PATENT DOCUMENTS 1,982,741 12/1934 Keenan ................................ 426/589
2,065,271 12/1936 Faulds .................................... 99/502

FOREIGN PATENT DOCUMENTS 52-130592 12/1979 Japan .

Primary Examiner—Philip R. Coe
Assistant Examiner—Timothy F. Simone
Attorney, Agent, or Firm—Wyatt, Gerber, Shoup, Scobey & Badie

[57] ABSTRACT

An apparatus for extracting the pulp from citrus fruits for the preparation of a fruit drink containing separate juice vesicles or sacs of the pulp comprises a plurality of clamps mounted on the periphery of a rotary drum to hold the halves of the fruits each divided into two across the core, with the cut surfaces exposed, a rotating shaft located opposite to one of the clamps in gripping position and substantially aligned to the core of each clamped half of the fruits for rotation about the common axis, and a nozzle having an opening provided radially with respect to the core of each halved fruit and attached to the end of the rotating shaft, whereby the pulp in the form of separate juice sacs is forced out of the halves by a jet of fluid from the nozzle.

4 Claims, 15 Drawing Figures

APPARATUS FOR EXTRACTING PULP FROM CITRUS FRUITS

This a continuation of application Ser. No. 027,930 filed Apr. 6, 1979, abandoned.

BACKGROUND OF THE INVENTION

(1) Field of the Invention

This invention relates to an apparatus for thoroughly extracting only the pulp from citrus fruits, such as mandarin oranges or tangerines. More particularly, the invention is concerned with an apparatus of the character in which a plurality of clamps are mounted on the periphery of a rotary drum to hold the halves of the fruits each divided into two across the core, with the cut surfaces exposed, a rotating shaft is located opposite to one of the clamps in gripping position and substantially aligned to the core of each clamped half of the fruits for rotation about the common axis, and a nozzle having an opening provided radially with respect to the core of each halved fruit is attached to the end of the rotating shaft, whereby the pulp in the form of separate juice sacs is forced out of the halves by a jet of fluid from the nozzle.

(2) Description of the Prior Art

For the extraction of mandarin orange or tangerine juice it is necessary to take out only the pulp from the fruits. An apparatus for separating and taking out the pulp from citrus fruits has already been proposed (Japanese patent application No. 130592/77). The apparatus, as illustrated in FIGS. 1 and 2, holds divided halves A' of tangerines by means of holding slats which, in turn, are supported at both ends by a pair of endless chains 2, 2; drives the chains to convey the fruits, with the cut surfaces directed downward, over and in sliding contact with a net 3; and subjects the moving fruits to jets of a fluid from injection nozzles 5 installed in banks on pipes beneath the net 3, so that only the pulp is forced out of the cut halves by the jets. The embodiment of the apparatus shown in FIG. 1 uses stationary nozzles 5 on fixed pipes, and the embodiment in FIG. 2 makes the pipes 4 rollable from side to side within a predetermined angle, with consequent swinging of the nozzles 5. In the latter case the jets of fluid are directed against wider areas of the cut surfaces of the halved tangerines A'.

With such a prior art apparatus the effect of pulp extraction is not high for the reasons now to be described, and part of the pulp often remains unremoved from the peel after the fluid injection. Since the injection nozzles 5 for directing the jets of fluid against the cut surfaces of halved tangerines A', while the fruits are being continuously moved forward by the conveyors, are simply fixed or swung from side to side, the jets are only locally applied to the cut surfaces. Therefore, any attempt to improve the pulp-extracting capacity by increasing the speed of the chains 2 will fail because it hampers thorough removal of the pulp from the individual tangerines.

OBJECTS AND SUMMARY OF THE INVENTION

It is an object of the present invention to provide an apparatus capable of completely extracting the pulp from citrus fruits.

Another object of the invention is to provide a pulp-extracting apparatus for citrus fruits which can be installed in a smaller space than the conventional ones.

These objects are realized in accordance with the invention by an apparatus characterized in that a plurality of clamps are mounted on the periphery of a rotary drum to hold the halves of the fruits each divided into two across the core, with the cut surfaces exposed, a rotating shaft is located opposite to one of the clamps in gripping position and substantially aligned to the core of each clamped half of the fruits for rotation about the common axis, and a nozzle having an opening provided radially with respect to the core of each halved fruit is attached to the end of the rotating shaft, whereby the pulp in the form of separate juice sacs is forced out of the halves by a jet of fluid from the nozzle.

The fluid to be jetted out in conformity with the invention is not limited to air, but nitrogen or carbonic dioxide may be employed as well. Further, the fruit juice obtained in the course of operation of the apparatus may be utilized for this purpose.

Other objects, features, and advantages of the invention will become more apparent from the following description taken in conjunction with the accompanying drawings.

DESCRIPTION OF THE PREFERRED EMBODIMENT

Figure 11:
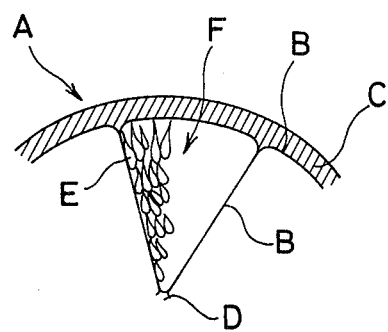
FIG. 11 is a fragmentary view of a cut surface of a tangerine.
Figure 12:
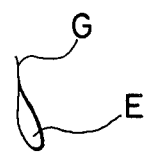
FIG. 12 is a view of a juice vesicle or sac of the pulp of a tangerine.

Now an embodiment of the present invention will be described in detail with reference to the drawings. In this embodiment the citrus fruit to be processed is represented, as an example, by mandarin orange or tangerine A. The tangerine A, as shown in FIG. 11, has a segmental membrane B covered by a peel C and radially segmented from the core D in the center. Segments F are thus formed of the segmental membrane B and pulp in the form of a mass of juice vesicles or sacs E, each of which has a taillike fiber G as better shown in FIG. 12.

Figure 1:
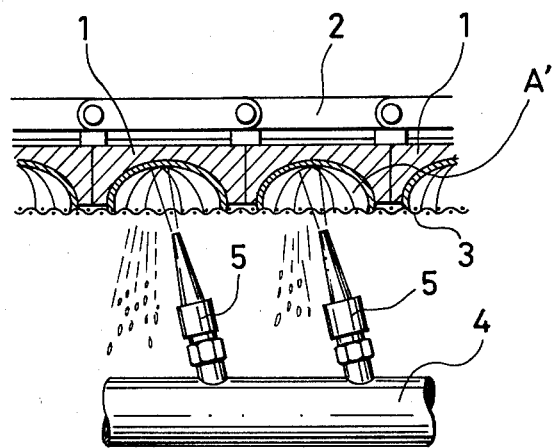
FIG. 1 is a fragmentary front view of a prior art pulp-extracting apparatus, partly sectioned to show the essential parts.
Figure 2:
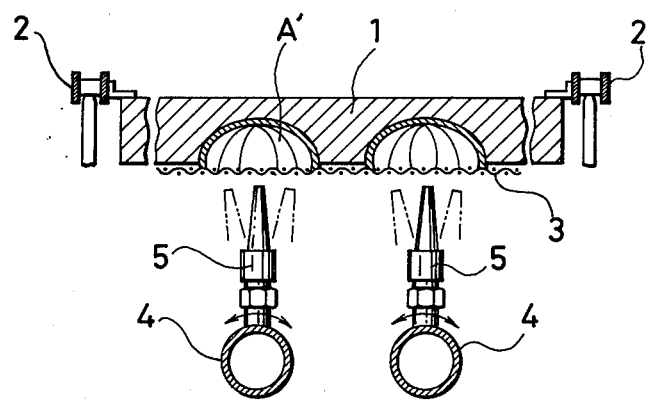
FIG. 2 is a fragmentary side view of a modified form of the prior art apparatus, partly sectioned to show the essential parts.
Figure 3:
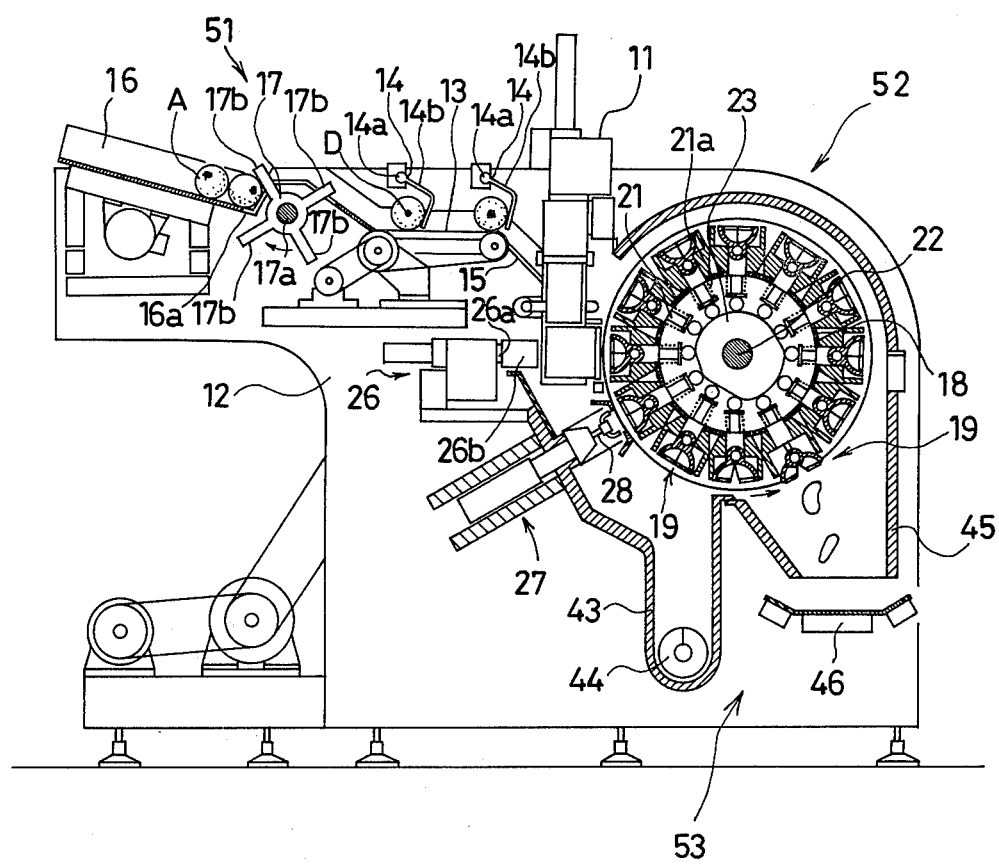
FIG. 3 is a general front view, partly in section, of an embodiment of the invention.

The pulp-extracting apparatus according to the invention comprises, as illustrated in FIG. 3, a unit 51 for feeding tangerines A to be processed, a unit 11 for cutting the tangerines into halves, a unit 26 for forcing the halved fruits into position for processing, a unit 27 for injecting a fluid into the halves, and a unit 53 for discharging the separated pulp sacs E, peel C and the like.

As is clear from FIG. 3, the unit 51 for feeding tangerines A consists of a chute 16, indexer 17, belt conveyor 13, two openable stoppers 14, and a chute 15. The chute 16, conveyor 13, and chute 15 are substantially aligned in a housing to provide a passage for the tangerines A from a hopper not shown to the halving unit 11. The chute 16 has a slit 16a formed at the exit end of its bottom. The indexer 17, on the other hand, is rotatably supported by the housing 12 with a pivot 17a, and has four arms 17b radially extending as from the pivot 17a in the center. It is located so that the pivot 17a is at a level below the chute 16 and the arms 17b extend and turn upward through the slit 16a and the passage of the chute 16. The pivot 17a is driven by a prime mover not shown. The stoppers 14, also turnably supported by the housing 12 with pivots 14a, include L-shaped arms 14b suspended from the pivots, and are so located that the pivots 14a are held above the belt conveyor 13 and the lower ends of the arms 14b are short of contact with the conveyor surface. The pivots 14a are rotated by drives not shown to swing the arms 14b above the belt conveyor 13.

The halving unit 11 divides the tangerines A fed by the chute 15 into halves and conveys the halves A' down to the pusher unit 26. Although not shown, each tangerine A fed to the halving unit 11, for example, is held by a pair of supports adapted to embrace the semispherical halves of the fruit, carried altogether downward to a cutter, divided into two, and the two halves A' still supported are moved further downward to the unit 26.

The pusher unit 26 is designed to force the halved tangerines A' into individual clamps 19 of the conveying unit 52. It carries a pusher 26b at the free end and is mounted in the housing 12 in such a way that the pusher 26b faces each clamp 19 and reciprocates relative to the housing 12. The construction may be modified, for example, by providing a piston at the rear end of the rod 26a and fitting the piston in a cylinder, so that the piston can be actuated by a working fluid entering or leaving the cylinder to move the pusher 26b on the opposite end forward or backward.

The conveying unit 52 for the halved tangerines A' conveys each of the halves already forced by the pusher unit 26 into place down to the position in front of the fluid injection unit 27. As shown in FIG. 3, and more specifically in FIG. 4, the unit 52 comprises a rotary drum 18, clamps 19, and a stationary cam 23. Rotatably supported by the housing 12, the drum 18 is intermittently rotated by drives not shown. It carries a plurality of clamps 19 facing radially outward on its periphery. The clamps 19 are designed to hold, one for each, the halves A' of tangerines cut across the core in two, with the cut surfaces exposed and directed outwardly. Each of the clamps 19 includes a set of claws 20 for gripping a halved tangerine A' at the outer end of a rod 21 which is slidable with respect to the rotary drum 18. Endwise sliding motion of the rod 21 closes or opens the set of claws 20 to hold the half A' firmly or release it. Each rod 21 is biased toward the center of the drum 18 by a spring 21a interposed between the rod 21 and the drum 18, and is in sliding contact with the periphery of the stationary cam 23 through a roller 21b attached to the inner end of the rod. The stationary cam 23 is fixedly mounted on a shaft 22, which is journaled in the housing 12. The cam 23 has small-diameter portions 24 and large-diameter portions 25, and means are provided to open and close the claws 20 in response to the sliding motion of the rod 21 that follows the cam contour, so that, when the roller 21b at the inner end of the rod 21 is in contact with one of the small-diameter portions 24, the claws 20 hold the halved tangerine A' firmly and, when the roller is in contact with a large-diameter portion 25, the claws are wide apart to release the fruit.

Figure 4:
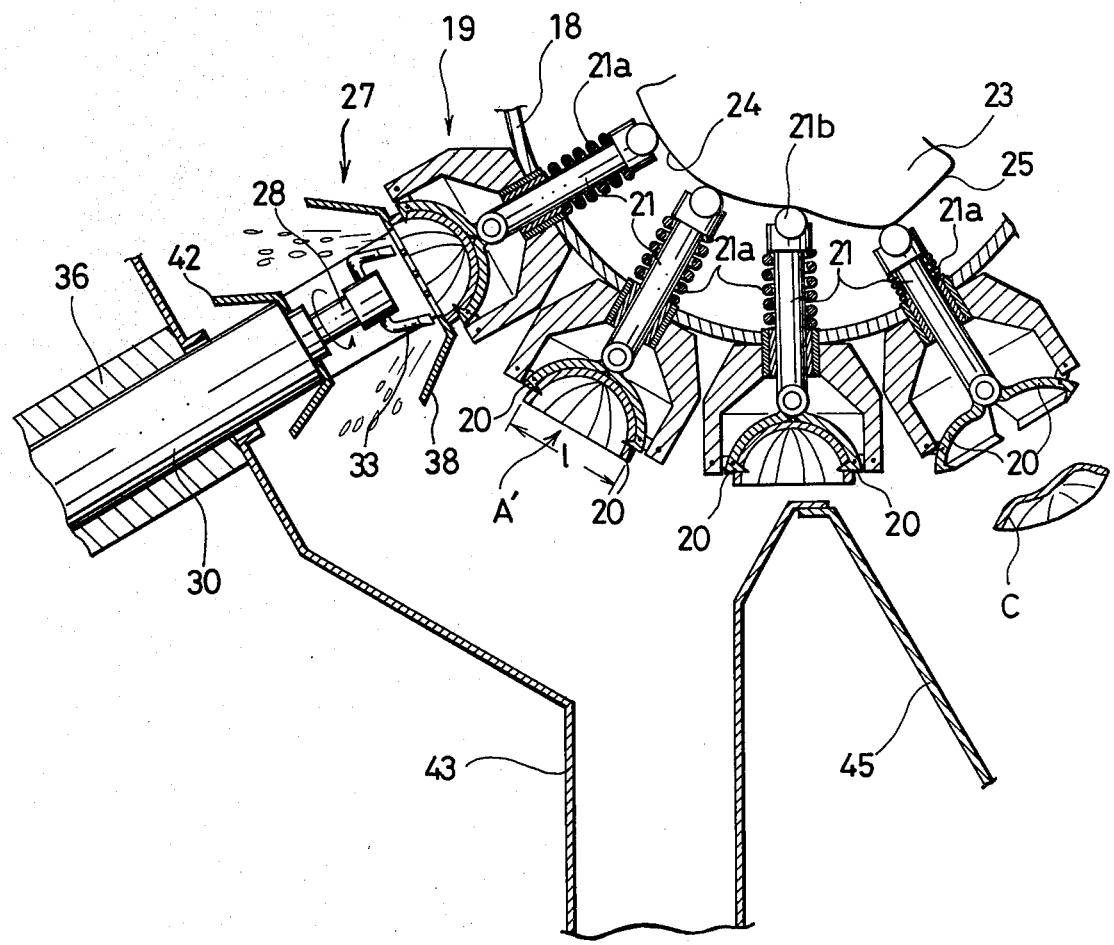
FIG. 4 is an enlarged sectional view of essential parts of FIG. 3.
Figure 5:
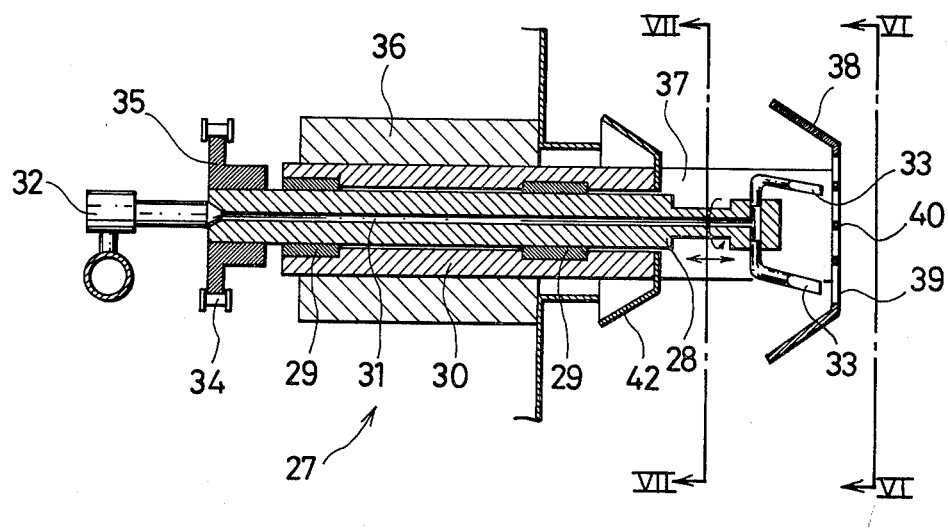
FIG. 5 is an enlarged sectional view of a fluid injection unit.
Figure 6:
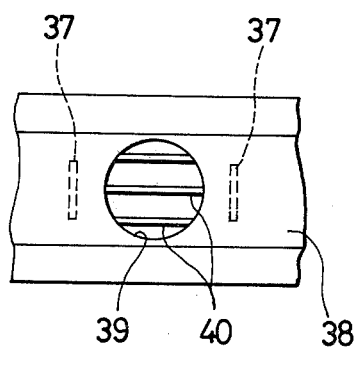
FIG. 6 is a sectional view taken on line VI—VI of FIG. 5.
Figure 7:
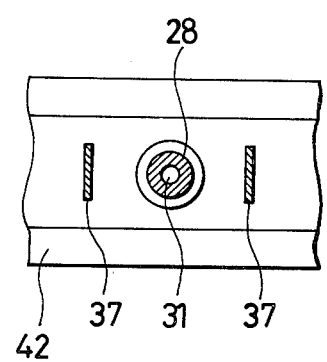
FIG. 7 is a sectional view taken on line VII—VII of FIG. 5.
Figure 8:
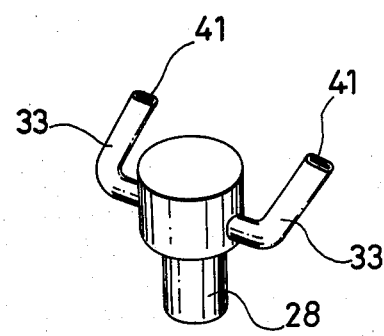
FIG. 8 is an enlarged perspective view of a nozzle connection.
Figure 9:
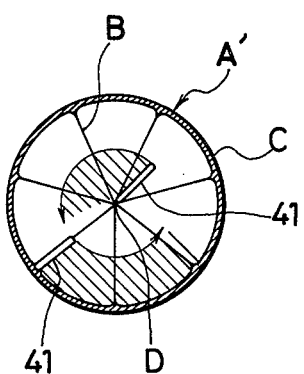
FIG. 9 is a diagrammatic view indicating the relative position of the cut surface of a halved tangerine and nozzle openings.

As FIGS. 4 and 5 indicate, the fluid injection unit 27 which is intended to force out the pulp in the form of juice sacs E from the half A' of tangerine held by each clamp 19 is installed beneath the pusher unit 26. This unit includes a rotating shaft 28 housed rotatably with bearings 29 in a cylinder 30, which is supported for endwise reciprocation by an axial shifter 36 secured to the housing 12. The fluid injection unit 27 is located so that the rotational center of the shaft 28 is substantially aligned to the core D of the halved fruit A' held by each clamp 19. The rotating shaft 28 has a small-diameter bore 31 which serves as a fluid passage, one end of which is communicated to a fluid pressure source not shown via a rotary joint 32. The opposite end of the bore is connected to nozzles 33 at the front end of the rotating shaft 28. On the rear end of the shaft 28 is fixedly mounted a sprocket 35 in mesh with a chain 34 and adapted to be driven by a motor not shown in order to rotate the shaft 28. To the cylinder 30 is attached, through holder plates 37, a pressure plate 38 immediately before the nozzles 33. As shown in FIG. 6, the pressure plate 38 has a hole 39 with a cross sectional area corresponding to the circle to be drawn by the nozzles 33 in motion. Several slender bars or wires 40 are fitted across the hole 39, which has a diameter substantially equal to the distance l between the claws 30 in gripping position. FIG. 8 shows two nozzles 33 attached to the front end of the rotating shaft 28, in parallel with each other and inclined from the central axis of the shaft 28 on a plane inclusive of the axis. As more clearly shown in FIG. 9, the openings 41 of the two nozzles 33 are flattened radially with respect to the core D of the halved tangerine A'. Throughout the figures the numeral 42 indicates a cover secured to the cylinder 30.

Turning to FIG. 3, the unit 53 for discharging the separated pulp sacs E, peel C and the like is shown as comprising a pulp-discharging chute 43 provided beneath the nozzles 33 of the injection unit 27, a discharge conveyor 44 installed in the lower part of the chute, a peel-discharging chute 45 provided adjacent to and ahead of the chute 43 as viewed in the running direction of the rotary drum 18, and a discharge conveyor 48 under the chute 45.

Although FIG. 3 shows the pulp-extracting apparatus as comprising one unit each for feeding, halving, pushing into position, conveying, fluid injection, and discharge, it will be readily understood by those skilled in the art that two or more apparatuses, each comprising the units 51, 11, 26, 52, 27, and 53, may be installed in parallel, or in the direction perpendicular to the drawing. Also, while the embodiment being described uses two injection nozzles 33 mounted on the rotating shaft 28, this is not a limitation to the invention, whatever the number of nozzles, it is of importance that the jets of fluid from the nozzles cover the entire cut surface of the half A' of tangerine.

In operation, the tangerines, sorted into size and quality classifications and washed beforehand, are led in a row by the chute 16 down to the indexer 17. They are separated from the row, one by one, and transferred by the indexer 17 intermittently onto the belt conveyor 13. The fruits are then carried by the belt conveyor 13 to the points where they are interrupted for some time by the arms 14a of the openable stoppers 14 and are caused to turn themselves by the moving conveyor until they assume the posture as shown in FIG. 3, with the cores D of the fruits directed perpendicular to the drawing. After a predetermined period of time the stoppers 14 open to feed the tangerines A to the halving unit 11 via the chute 15.

In the halving unit 11 each tangerine A is divided across the core D into two before being transferred to the space in front of the pusher 26b of the pusher unit 26.

Each half A' of tangerine brought to the point facing the pusher 26b is then forced into one of the clamps 19 on the rotary drum 18 which is temporarily out of motion, and is held in place by the claws 20. Next, the drum 18 turns by a pitch to bring the halved tangerine A', gripped by the claws 20, to the position opposite to the nozzles 33.

Referring now to FIGS. 10(a) to (d), extraction of the pulp from the fruit will be described. Upon delivery of the halved fruit to this position, the cylinder 30 of the fluid injection unit 27 is moved toward the drum 18 by the axial shifter 36, and the bars or wires 40 on the hole 39 of the pressure plate 28 at the front end of the cylinder 30 advances in the direction of an arrow X into contact with the cut surface of the halved tangerine A' [FIGS. 10(a) and (b)]. The half A' seated in the clamp 19 and gripped by the claws 20 is not always in an exactly uniform, regular position, but it can now be kept in the regular position with the aid of the pressure plate 38. At this point, rotational power is transmitted by means not shown to the endless chain 34 and hence, through the sprocket 35 in mesh with the chain 34, the rotating shaft 28 is rotated together with the nozzles 33 at the free end. Simultaneously, a fluid, such as air under pressure, cleaned by means not shown is supplied through the rotary joint 32 into the bore 31 and issued out of the nozzles 33 [FIG. 10(c)]. Since the nozzles 33 have the openings 41 flattened radially with respect to the core D of the fruit as already described, the jets of air from the nozzles are directed against almost the entire cut surface of the halved tangerine A' to force their way into the pulp, pushing apart the individual juice vesicles or sacs E of the pulp. Upon arrival at the peripheral wall portions of the segmental membrane B that converge at the extremities of the halved segments, the air streams are shifted in direction, disconnecting the tail-like fibers G of the pulp sacs E from the segmental membrane B. In this manner the separation of the sacs E from each other and also from the segmental membrane is effectively accomplished, and the sacs unimpaired in shape fall into the discharge chute 43. The pressure plate 38 keeps the sacs from scattering in undesired directions.

Figure 10:
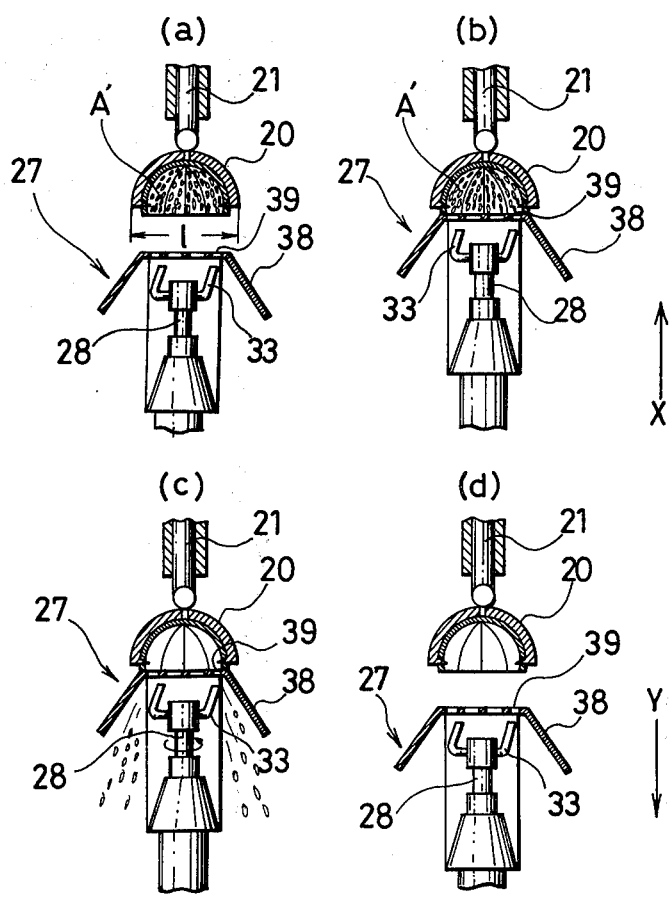
FIGS. 10(a) to (d) are sequential views illustrating the operation of the injection unit, showing the unit out of action (a), approaching a clamp (b), issuing a fluid from its nozzle openings (c), and retracted to the initial position (a) (d)

On completion of the pulp sac extraction, the injection unit 27 retracts in the direction of an arrow Y [FIG. 10(d)] to the original position. Following this, the drum 18 turns further pitches to carry the clamp 19 sideways as viewed in the drawings. The particular clamp 19 continues to hold the pulpless half of tangerine A' firmly by the peel C throughout its movement from the point where it faces the pusher unit 26 to a point above the peel-discharging chute 45, because, during the same period, the roller 21a at the inner end of the rod 21 is in sliding contact with the small-diameter portion 24 of the cam 23. As the clamp reaches the point above the peel-discharging chute 45, the roller at the inner end of the rod 21 rides on the large-diameter portion 25 of the cam 23, with the consequence that the rod is forced outward to open the claws 20 and release the empty fruit or peel C downward. The fruit residues are thus delivered to the outside by the discharging conveyor 46.

According to this invention, the nozzle openings are so shaped as to face the cut surface of the fruit radially with respect to its core, and therefore the jets of fluid from the nozzles are directed against the entire cut surface by the rotation of the nozzle shaft to extract the pulp sacs thoroughly from the halved fruit.

What is claimed is:

1. An apparatus for extracting pulp from citrus fruits, comprising means including a plurality of clamps mounted on the periphery of a rotary member for holding halves of the citrus fruit cut across their respective cores and bringing them into an extraction position with their cut surfaces exposed, and extraction means at said extraction position for rotating a fluid jet against said cut surfaces to extract pulp from said halves, said extraction means including a rotatable shaft substantially coaxial with said halves held in said extraction position and two nozzles rotated by said shaft and each having an elongate opening extending radially across the exposed surface of said halves held in said extraction position, said two nozzles being offset in the radial direction of the halves in said extraction position whereby one of said nozzles will direct a fluid jet toward the outer portions of said halves while the other nozzle will direct a fluid jet toward the inner portions of said halves during rotation of said shaft.

2. An apparatus according to either claim 1, said extracting means further including a pressure plate provided forwardly of each said nozzle and means for holding said pressure plate stationary against the halved fruit during rotation of said shaft.

3. An apparatus according to claim 1, which further comprises a unit for dividing said fruits into halves, and a unit for supplying said fruits in a preselected regular posture, said latter unit including a belt conveyor installed in a housing and openable stoppers mounted close to the upper surface of said belt conveyor, said stoppers retaining said fruits on said belt conveyor for some time and allowing them to turn on their axes and assume the regular posture.

4. An apparatus according to claim 1, in which said drum is rotatably supported by a housing, said plurality of clamps are radially supported on the periphery of said drum, a pusher unit for forcing the halved fruits into said clamps and the fluid injection nozzle are both mounted in said housing in a zone through which said clamps pass, and a pulp-discharging chute and a peel-discharging chute are separately located under the clamp-passing zone.

* * * * *

UNITED STATES PATENT AND TRADEMARK OFFICE
CERTIFICATE OF CORRECTION

PATENT NO. : 4,300,448
DATED : October 13, 1981
INVENTOR(S) : Masayuki Hayashi et al It is certified that error appears in the above—identified patent and that said Letters Patent is hereby corrected as shown below:

On the title page, line 4 of assignee "Co-Operatives", Wakayama, both of" should read -- Co-Operatives, Wakayama Pref., Wakayama, both of --.

Signed and Sealed this

Twenty-fifth Day of May 1982

[SEAL]

Attest:

Attesting Officer

GERALD J. MOSSINGHOFF

Commissioner of Patents and Trademarks